UNITED STATES PATENT OFFICE.

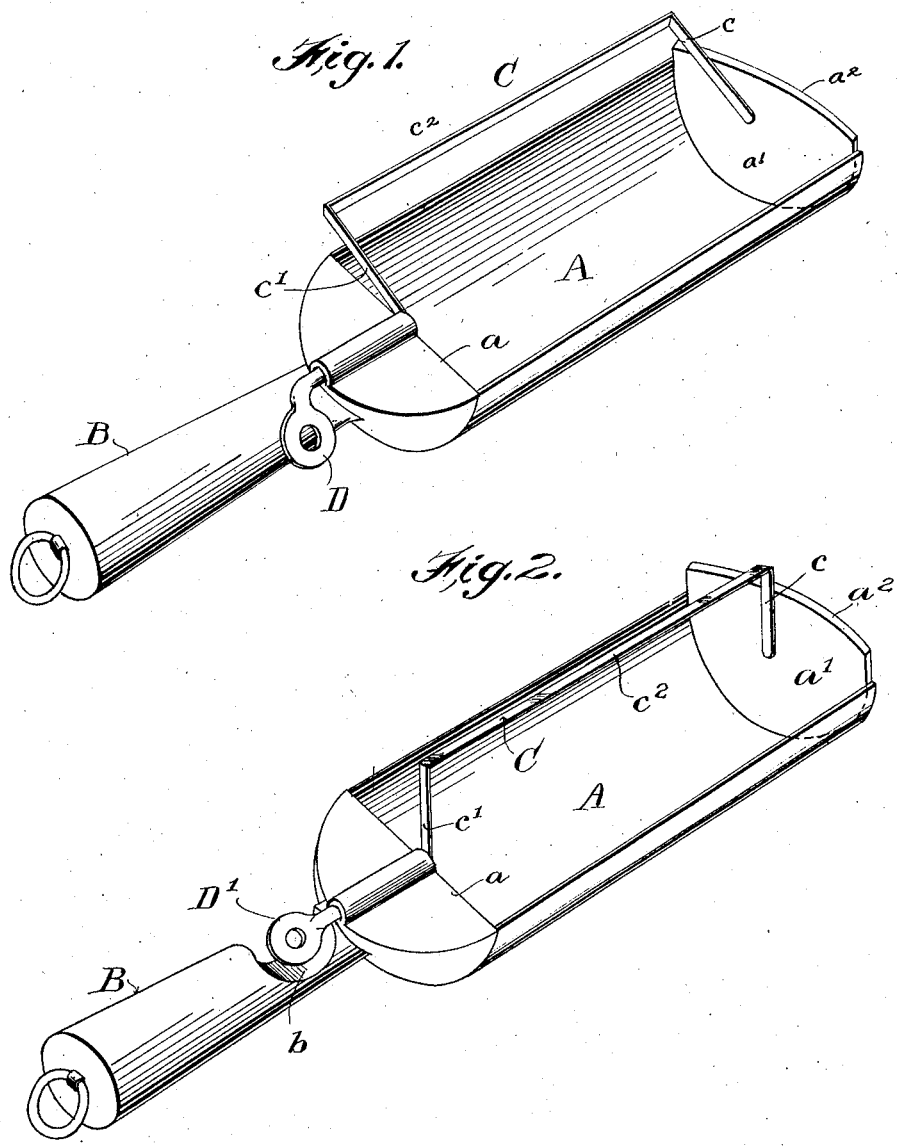

GEORGE C. CATO, OF ROME, GEORGIA.

SCOOP.

1,333,387. Specification of Letters Patent. Patented Mar. 9, 1920.

Application filed August 15, 1919. Serial No. 317,700.

*To all whom it may concern:*

Be it known that I, GEORGE C. CATO, a citizen of the United States, residing at Rome, in the county of Floyd and State of Georgia, have invented certain new and useful Improvements in Scoops, of which the following is a specification.

This invention relates to scoops of the kind sometimes employed for taking butter, lard, or the like from the cans, tubs, or other receptacles containing it. Commonly ordinary paddles are used for this purpose, but scoops of various kinds have been suggested and no doubt used. The ordinary scoop, however, is of such shape or such construction that it is difficult to detach the lard or other substance from it, or if shaped in the usual way it will not take up the substance in sufficient quantities without dropping it.

According to my invention I provide a scoop which may be readily inserted in the substance, will take up a large quantity thereof, and the substance may be readily detached therefrom.

In carrying out my invention I make the body of the scoop semi-cylindrical, open at the top and closed at both ends and the sides. The rear end of the body is provided with a handle of suitable form. The front part which closes the front end of the body projects beyond the side edges thereof so as to provide a blade which cuts into the substance and facilitates in filling the scoop. This last mentioned feature is believed in itself to be novel.

In order to clean the scoop or detach the substance therefrom, I provide a scraper which is pivotally connected to the opposite ends of the scoop and is provided with a handle for operating it. The scraper or cleaner comprises parallel end pieces and a longitudinal connecting piece, these three members being so arranged as to scrape or clean all the walls of the scoop and detach the substance therefrom.

In the accompanying drawings:—

Figure 1 is a perspective view of one form of scoop embodying my improvements.

Fig. 2 is a perspective view of a modification.

Referring to Fig. 1, the body portion A is of general semi-cylindrical form, *i. e.*, it is semi-circular in cross section. It is closed at its rear end $a$ and at its front end it is closed by an end piece $a'$ which has a blade $a^2$ extending beyond the edges of the body. A handle B is connected to the rear end of the scoop in any suitable way.

A scoop thus constructed may be employed for taking lard, butter, and other substances from cans, tubs, or other receptacles. The handle is so held as to draw the blade diagonally into the substance and in this way the scoop is easily filled, and as it is of large dimensions a large quantity of the substance may be removed.

I may provide the scoop with a cleaner, consisting of a scraper C having parallel arms $c$, $c'$ at opposite ends and a longitudinal connecting piece $c^2$. The inner ends of the arms are pivotally connected with the ends of the body portion of the scoop and the rear arm $c'$ is connected with a handle D, by means of which the scraper may be operated. By these devices the scraper may be swung in opposite directions to thereby detach any adhering substances or to detach the substance in a body in case it tends to adhere to the scoop.

In Fig. 1, the blade $a^2$ projects only a short distance beyond the side edges of the scoop. In Fig. 2 the blade is made to extend a greater distance therefrom, as by this means the scoop may be more readily inserted into the substance. The parts shown in Fig. 2 are in general similar to those shown in Fig. 1 and are similarly lettered, the only important difference being that the blade $a^2$ is prolonged as before described. In such case, however, in order to properly operate the scraper so as to act on all parts of the ends of the scoop it is necessary to give the handle a wider range of movement and for this purpose the handle D is made of the form shown and the handle B of the scoop is cut away at $b$ so that the handle D may revolve completely and thus give to the scraper the necessary range of movement.

I claim as my invention:—

1. A scoop having an outer end piece with a blade projecting at both ends beyond the longitudinal edges of the scoop.

2. A scoop having a semi-cylindrical body portion closed at each end and having a blade at its outer end projecting at both ends beyond the longitudinal edges of the sides of the scoop.

3. A scoop comprising a body portion provided with a handle and closed at opposite ends, and a scraper for the scoop comprising two narrow parallel arms pivotally connected at their inner ends with the ends of the scoop and adapted to clean the ends thereof, and a narrow longitudinal connecting piece or bar at the outer ends of the arms adapted to clean the interior of the body of the scoop.

4. A scoop comprising a body portion provided with a handle and closed at opposite ends, and a scraper for the scoop comprising two parallel arms pivotally connected at their inner ends with the ends of the scoop and adapted to clean the ends thereof, a longitudinal connecting piece at the outer ends of the arms adapted to clean the interior of the body of the scoop, and a handle at the rear end of the scoop for operating the scraper.

5. A scoop, comprising a body portion closed at opposite ends and provided with a handle having a recessed part and a scraper comprising parallel arms pivotally connected to the ends of the scoop at their inner ends and joining at their outer ends, a longitudinally arranged connecting piece adapted to scrape the body of the scoop, said scraper being provided with a handle having a part operating in the recess of the handle of the scoop.

In testimony whereof, I have hereunto subscribed my name.

GEORGE C. CATO.